March 25, 1947. T. K. ANDERSEN Re. 22,855
DIGGING ATTACHMENT FOR TRACTORS OR THE LIKE
Original Filed Sept. 24, 1942 2 Sheets-Sheet 1
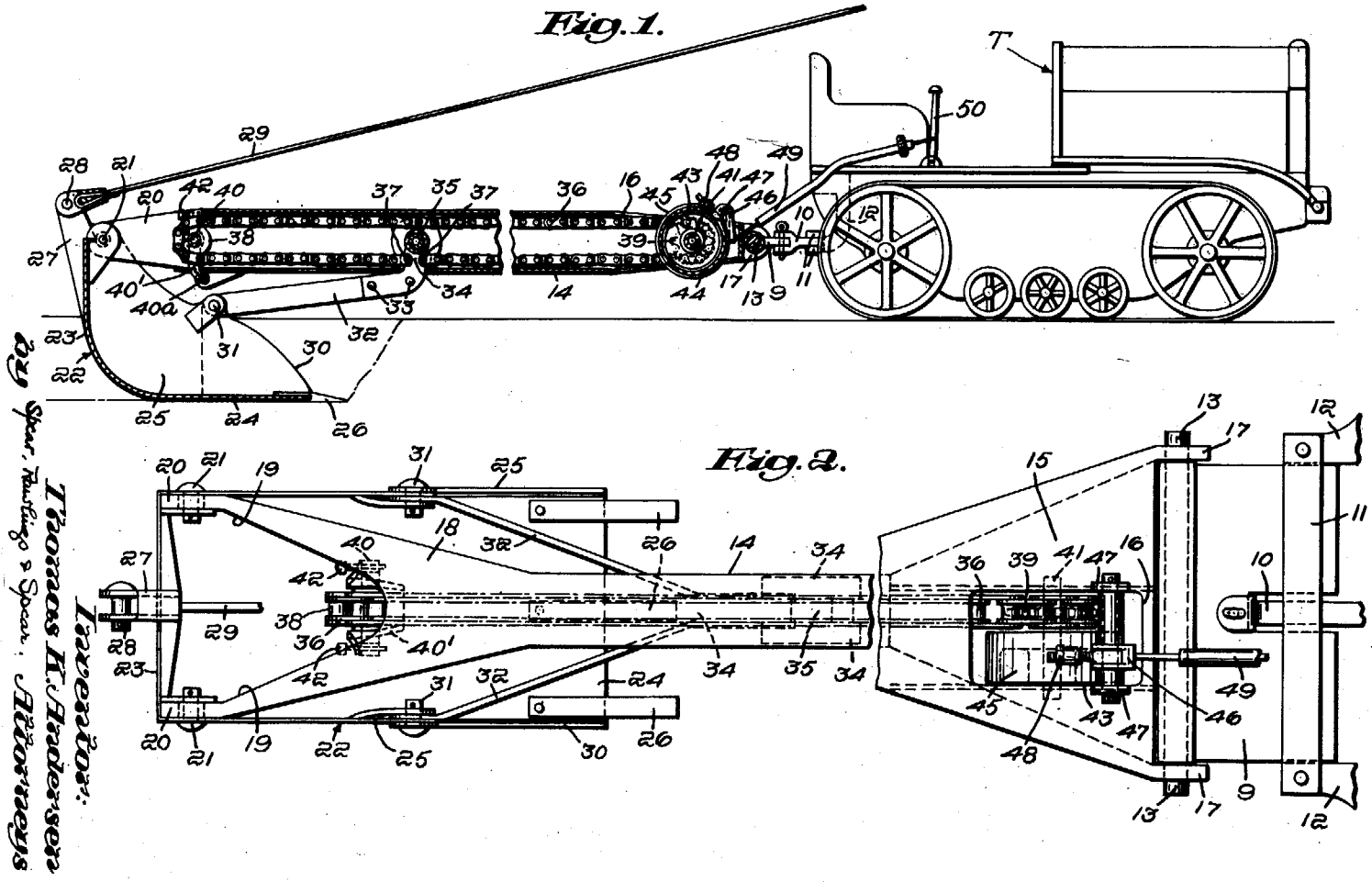
Inventor:
Thomas K. Andersen
by Spear, Rawlings & Spear, Attorneys March 25, 1947. T. K. ANDERSEN Re. 22,855

DIGGING ATTACHMENT FOR TRACTORS OR THE LIKE

Original Filed Sept. 24, 1942 2 Sheets-Sheet 2

Inventor:
Thomas K. Andersen,
by Spear, Rawlings & Spear, Attorneys

Reissued Mar. 25, 1947

Re. 22,855

UNITED STATES PATENT OFFICE 22,855

DIGGING ATTACHMENT FOR TRACTORS OR THE LIKE

Thomas K. Andersen, Port Richmond, N. Y.

Original No. 2,365,164, dated December 19, 1944, Serial No. 459,524, September 24, 1942. Application for reissue December 6, 1945, Serial No. 633,242

8 Claims. (Cl. 37—118)

This invention relates to a trench digging attachment for a tractor or other self-propelled vehicle, and consists in the novel construction, combination and relationship of parts described and illustrated in the accompanying specification and drawings and particularly pointed out in the appended claims.

The general object of my invention is to provide auxiliary equipment to be attached to the tractor or other vehicle for the purpose of digging trenches or similar excavating work, which equipment is relatively inexpensive in cost, reliable in operation and capable of convenient application to the several different makes of tractors or other vehicles now on the market.

Other objects and advantages will appear as the description proceeds.

More especially, my invention aims to provide a digging attachment for a tractor or other vehicle which is so designed and constructed that the vehicle operator at all times and under all conditions of use may maintain full control of the digging bucket or other digging implement when the same is being lowered into digging position, when filling, when being lifted to dumping position, and when dumping.

In accomplishing my objects, I prefer to construct my digging attachment as a boom to be pivoted at its forward end to the drawbar of the tractor or other vehicle and to carry adjacent its rear end a pivoted bucket or other appropriate digging implement. The bucket is swung to and maintained in its several positions for digging, filling, and dumping as the tractor or other vehicle is advanced, stopped, and turned, by means of suitable mechanical or hydraulic connections within the convenient control of the vehicle operator.

In the accompanying drawings I have shown two embodiments of my invention applied to a tractor of conventional type. In one embodiment the mechanism for controlling the bucket or other digging implement is mechanical. In another embodiment, it is hydraulic. Both embodiments afford positive control of the digging implement at all times and under all conditions of service.

In such drawings:

Figure 1 is a side elevation, partly in section, showing my digging attachment pivoted to the drawbar of a tractor of conventional type, the connections for controlling the bucket being mechanical.

Figure 2 is an enlarged fragmentary top plan view of the digging attachment shown in Fig. 1, removed from the vehicle.

Figure 3:
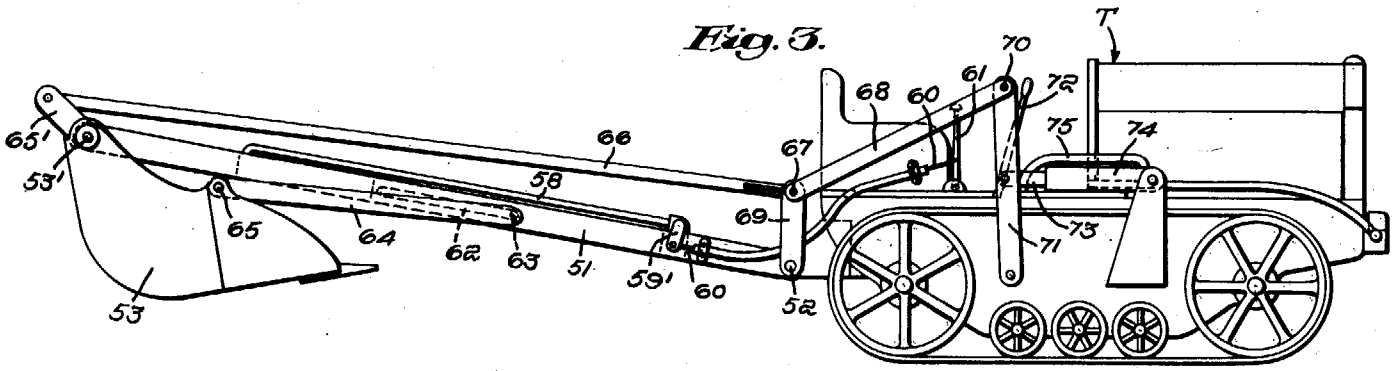
Figure 3 is a view generally similar to Fig. 1, but showing hydraulic instead of mechanical connections for controlling the bucket, or other digging implement.

I have indicated at T in Figs. 1 and 3 a tractor of conventional design.

In Fig. 1, the tractor is shown as provided with a drawbar connection 9, a drawbar 10, drawbar guides 11, and a bracket support 12 for the drawbar.

Pivoted at its forward end at 13 to the drawbar connection 9 is a boom 14. In the embodiment shown in Figs. 1 and 2, the boom is tubular. Its forward end is flared as at 15, cut-out vertically as at 16, and provided with spaced ears 17 to straddle the drawbar connection 9 and receive the pivot shaft 13. Its rear end is reversely flared as at 18 and forked as at 19 to provide spaced ears 20 in which the pivots 21 of a digging implement, here shown as a bucket 22, are received.

The bucket 22 is in the general form of an open-front, closed back scoop having a substantially vertical back wall 23 merging into a substantially horizontal bottom wall 24, and spaced side walls 25 connecting said back and bottom walls. The forward edge of the bottom wall is preferably provided with suitable digging teeth 26.

Extending rearwardly and upwardly from the back wall 23 of the bucket, centrally thereof, is a bracket 27 within which is fastened a cable hook-up pin 28 to which is made fast the rear end of a lifting cable 29 for controlling the raising and lowering of the boom and bucket. The forward edges 30 of the side walls 25 of the bucket function as cutting edges and accordingly may be suitably reinforced, as required.

Obviously, the configuration of the bucket itself will depend upon the nature of the work which the bucket is to do. For trench digging, the design of bucket shown has been found extremely satisfactory in respect to its functions of digging, fill and emptying.

The forward end of cable 29 is made fast to any suitable winch, hydraulic lift, or equivalent mechanism (not shown). Where a winch is employed, it is preferably driven from the tractor motor by means of a conventional power take-off (not shown) under the control of the tractor operator through a suitable clutch and clutch lever (not shown). By this construction the boom may be lowered to move the bucket to digging position and raised to move the filled bucket to dumping position.

The angularity of the bucket when in digging position and the filling and dumping of the bucket is controlled by the mechanism now to be described.

Pivoted at 31 to the side walls of the bucket at appropriate points along their length is a pair of links 32 which extend forwardly and upwardly and at their forward ends converge towards each other and lie alongside the boom 14. Bolted or otherwise fastened as at 33 to the forward ends of said links is a trolley 34 in the form of a pair of wheels pressed on each end of a suitably bushed shaft 35 and enclosed within the hollow boom so as to be protected thereby.

Also enclosed within said boom is a sprocket chain 36, the ends of which are made fast as at 37 to a trolley 34. Chain 36 is trained over a pair of sprockets 38 and 39 mounted on suitably bushed sprocket shafts 40 and 41 journaled transversely of the boom adjacent its ends.

Sprocket 38 is an idler and sprocket 39 is a driving sprocket. Idler sprocket shaft 40 is carried in any suitable yoke 40′ pivoted as at 40a on the boom, and any suitable tension means, indicated generally at 42, may be provided adjacent sprocket 40 for regulating the tension of the sprocket chain.

Sprocket shaft 41 is a combination sprocket and brake drum shaft. It and the associated brake mechanism is mounted within the cut-out 16 at the enlarged forward end 15 of the boom.

Such brake mechanism includes a brake drum 43, brake lining 44, brake band 45, brake lever 46, brake anchor 47, brake adjusting nut 48 and brake cable 49 connected at one end to brake lever 46 and at its other end to hand lever 50 mounted on the tractor within convenient reach of the operator. By means of this construction, the tractor operator may positively control the angular position of the bucket at all times.

In operating this embodiment of my invention, and assuming that the bucket has just been dumped and the parts left in such dumping position, that is, with the boom raised to an angle of substantially 45°, the bucket hanging substantially vertically downwardly, and the brake off, the operator first moves the tractor into position to place the bucket over the ground in which the trench is to be dug. Then by means of cable 29 the bucket is lowered into digging position until the bucket teeth strike the bottom of the trench, whereupon the tractor is backed up slightly so that the bucket can turn counter-clockwise on its pivots to point its teeth forwardly at the correct digging angle. Brake lever 50 is next manipulated to apply the brake, thereby locking the bucket rigid with the boom, insofar as its angularity is concerned. With the brake still applied, the operator drives the tractor ahead until the bucket has cut itself a full load of dirt and is ready to be lifted and emptied.

In order to prevent the load from accidentally dumping from the bucket when it is being raised to dumping position, the brake is now released and the tractor backed up slightly, whereupon the ground friction of the filled bucket causes the trolley 34 to roll forwardly and the bucket to thereby be tilted counterclockwise about its pivots 21 upwardly into substantially closed or non-spilling position.

The brake is then applied again to hold the bucket in this non-spilling position, whereafter the operator by means of cable 29 lifts the bucket from the ground, then swings the tractor laterally to one side to carry the boom and bucket to the opposite side of the tractor in position to be dumped, and dumps the bucket by again releasing the brake to permit the bucket to tilt about its pivots 21 downwardly into dumping position.

When the bucket has been dumped, the operator swings the tractor in reverse direction to bring the bucket back to digging position in readiness to dig another load when the tractor is again moved ahead.

Figure 4:
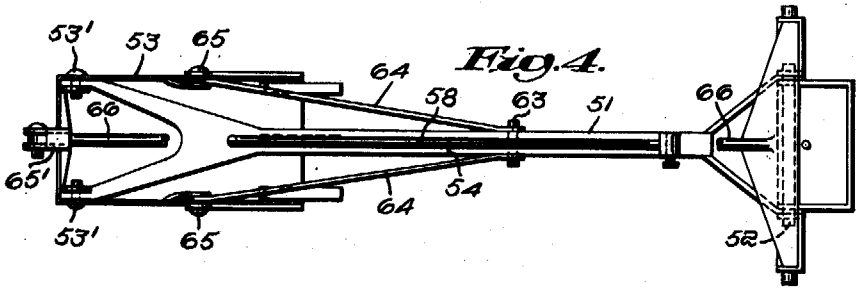
Figure 4 is a plan view of the digging attachment shown in Fig. 3, removed from the vehicle.
Figure 5:
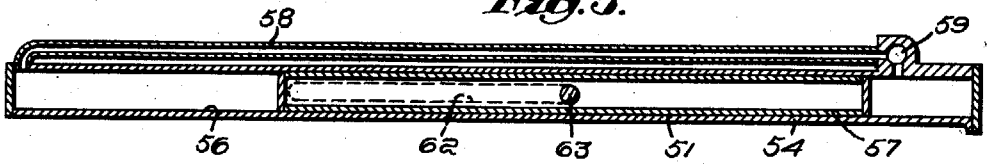
Figure 5 is a detail section through the double-acting hydraulic ram used with the digging attachment shown in Figs. 3 and 4.

In the embodiment of my invention depicted in Figures 3, 4, and 5, the construction and operation of the implement is generally the same as given for the embodiment of Figures 1 and 2, except that the control of the bucket is hydraulic rather than mechanical.

Referring to Figures 3, 4, and 5, the boom is indicated generally at 51, the drawbar pivot at 52, and the bucket at 53 and bucket pivots at 53′.

The hydraulic mechanism for controlling the angularity of the bucket includes a double-acting hydraulic ram 54 carried by the boom 51. As detailed in Figure 5 such ram comprises a cylinder 56 and piston 57. Surmounting the cylinder and extending longitudinally thereof is a pipe 58 containing the pressure fluid. The ends of this pipe open into the ends of the cylinder, and the delivery of pressure fluid to one end or the other of the cylinder is controlled by a suitable valve (not shown) mounted in valve chamber 59 and operated through lever 59′ and cable 60 from hand lever 61 mounted on the tractor within convenient reach of the driver.

Cylinder 56 is longitudinally slotted as at 62 for a substantial distance to receive a pin 63 made solid with piston 57 and connecting the forward extremities of a pair of bucket links 64, the rear ends of which are pivoted as at 65 to the sides of the bucket. By this construction the operator is able at all times to accurately control the angularity of the bucket in digging, filling and emptying.

As shown in this embodiment of my invention, the bucket is also adapted to be raised and lowered by hydraulic means. For this purpose, bracket 65′ extending from the upper rear edge of the bucket is connected to the rear end of a rod 66. The forward end of said rod receives a pin 67 on link 68. Pin 67 extends through the upper end of a pivoted support 69. The other end of link 68 is pinned at 70 to the upper end of a pivoted support 71 mounted on the tractor.

Fast to support 71 is one end of the piston 73 of a single acting hydraulic ram, the cylinder of which is indicated at 74. The supply of fluid through pipe 75 to said cylinder is regulated by means of a hand lever 72 pivoted to the tractor within convenient reach of the operator and controlling a valve (not shown) associated with said pipe. By this construction, the operator is likewise able at all times to accurately control the raising and lowering of the bucket.

Although I have shown my digging attachment applied to a tractor, it obviously may be used with vehicles other than tractors. The design of the bucket or other digging implement will likewise depend upon the nature of the work to be performed. Where trenches are to be dug, such implement will take the form of a digging bucket, and is so shown in these drawings. Where other excavating work is to be performed, the digging implement will be appropriately designed to best perform such work.

Various other modifications in form, construction and arrangement may obviously be made within the spirit and scope of my invention as defined by the appended claims.

What I therefore claim and desire to secure by Letters Patent is:

1. A digging attachment for a self-propelled vehicle, comprising a boom to be pivoted at its forward end to the rear of the vehicle, a digging implement pivoted to said boom adjacent the rear end thereof to swing therebeneath, operator-controlled means for raising and lowering said boom and digging implement, linkage pivoted at its rear end to said digging implement, means for slidably supporting the forward end of said linkage for movement along said boom, said last-named means comprising a pair of spaced sprockets mounted on said boom, a chain trained over said sprockets, and a trolley at the forward end of said linkage disposed between said sprockets and to which the ends of said chain are fastened, and a hand brake in control of one of said sprockets for selectively holding the sliding end of said linkage at any desired position along its path of movement with respect to said boom.

2. The digging attachment of claim 1, the boom including at its ends outwardly flared portions each presenting a pair of spaced alined ears, pivot means through one pair of ears for connecting the rear end of said boom to said digging implement, a draw bar connection, and pivot means through the other pair of ears for connecting the forward end of said boom to said draw bar connection.

3. A digging attachment to operate behind a tractor, comprising a tiltable bucket closed at its back and having a digging edge at its front and rotatable angularly through successive digging, closing and dumping positions, a boom disposed in the fore and aft line of the tractor, pivot means connecting the back of the bucket to the rear end of said boom so that the bucket is disposed beneath the boom, means connecting the front end of the boom to the rear end of the tractor so that the boom may be swung vertically relative to the tractor to carry the bucket through an arc of substantial length from a digging position at or below ground level to a dumping position at a considerable distance above the ground, said means arranged to prevent lateral movement of the boom relative to the tractor, a connection from the tractor to the boom and bucket assembly for raising the filled bucket to dumping position and for lowering the empty bucket to the ground so that it may be tilted into digging position when the tractor is moved slightly to the rear, and means for locking the bucket in digging position to that it will dig when the tractor is moved forwardly, for unlocking the bucket when filled to permit it to tilt to its closed position when the tractor is moved slightly to the rear, for re-locking the filled and closed bucket while the boom is being raised and swung laterally to carry the bucket to its dumping position, and for unlocking the filled and closed bucket when it reaches its dumping position so that it may dump, said last-named means including a link having a pivotal connection at its rear end with the bucket and a sliding connection at its forward end with the boom, and means for selectively holding the sliding connection at any desired position relative to the boom.

4. The digging attachment of claim 3, wherein the rear end of the connection from the tractor is attached to the bucket at a point spaced from the pivot point of the bucket and boom so that the weight of the boom when the bucket is unlocked may apply leverage to revolve the bucket.

5. The digging attachment of claim 3, wherein the sliding connection and the holding means therefor include a piston, a cylinder for said piston, a pipe connecting the ends of said cylinder, said cylinder having a longitudinal slot and said piston having a pin solid therewith and with the forward end of said link and operating in said slot, and means for controlling the movement of fluid within said pipe.

6. The digging attachment of claim 3, and hydraulic means for operating the connection from the tractor to the boom and bucket assembly.

7. A digging attachment to operate behind a vehicle, comprising a boom of a length equal at least to the length of the vehicle and extending rearwardly of the vehicle in the fore and aft line thereof, a forwardly open digging receptacle pivoted to the rear end of the boom and rotatable angularly about its pivot through successive digging and dumping positions, the rear portion of the boom being narrower than the receptacle, a horizontal transverse pivot attaching the forward end of the boom to the rear end of the vehicle for swinging movement in a vertical plane whereby the rear end of the boom may be swung an appreciable distance above or below the ground level, said pivot rigidly attaching the boom to the vehicle in the horizontal plane so that the boom will follow the lateral movements of the vehicle, a hoist connection from the vehicle to the boom for raising the filled receptacle to dumping position and for lowering the empty receptacle to digging position, and means for selectively holding the receptacle against rotation about its pivot on the boom.

8. A digging attachment to operate behind a vehicle, comprising a boom of a length equal at least to the length of the vehicle and extending rearwardly of the vehicle in the fore and aft line thereof, a forwardly open digging receptacle carried by the rear end of the boom, the rear portion of the boom being narrower than the receptacle, means for causing the discharge of the material from the receptacle, a horizontal transverse pivot attaching the forward end of the boom to the rear end of the vehicle for swinging movement in a vertical plane whereby the rear end of the boom may be swung an appreciable distance above or below the ground level, said pivot rigidly attaching the boom to the vehicle in the horizontal plane so that the boom will follow the lateral movements of the vehicle, and a hoist connection from the vehicle to the boom for raising the filled receptacle to dumping position and for lowering the empty receptacle to digging position.

THOMAS K. ANDERSEN.

REFERENCES CITED

The following references are of record in the file of this patent:

UNITED STATES PATENTS

| Number | Name | Date |
|---|---|---|
| 1,526,288 | Burke | Nov. 17, 1925 |
| 1,755,574 | Coffman | Apr. 22, 1930 |
| 1,760,116 | Coffman | May 27, 1930 |
| 1,831,222 | Andersen et al. | Nov. 10, 1931 |
| 2,308,590 | Douthitt | Jan. 19, 1943 |